(12) United States Patent
Miyamoto (10) Patent No.: US 9,350,891 B2
(45) Date of Patent: May 24, 2016

(54) IMAGE FORMING SYSTEM, IMAGE FORMING APPARATUS, AND NON-TRANSITORY COMPUTER READABLE RECORDING MEDIUM STORING A SETUP PROGRAM

(71) Applicant: KYOCERA Document Solutions Inc.

(72) Inventor: Takanori Miyamoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 14/467,569

(22) Filed: Aug. 25, 2014

(65) Prior Publication Data

US 2015/0062609 A1    Mar. 5, 2015

(30) Foreign Application Priority Data

Aug. 29, 2013    (JP) .................................. 2013-178663

(51) Int. Cl.
| | | |
|---|---|---|
| H04N 1/00 | (2006.01) | |
| H04L 29/08 | (2006.01) | |
| G06F 3/12 | (2006.01) | |
| G06F 9/445 | (2006.01) | |
| H04L 12/28 | (2006.01) | |

(52) U.S. Cl.
CPC .......... *H04N 1/00973* (2013.01); *G06F 3/1204* (2013.01); *G06F 3/1232* (2013.01); *G06F 3/1254* (2013.01); *G06F 3/1285* (2013.01); *G06F 9/44505* (2013.01); *H04L 12/2809* (2013.01); *H04L 67/34* (2013.01); *H04N 1/0097* (2013.01); *H04N 1/00127* (2013.01); *H04N 1/00204* (2013.01); *H04N 1/00411* (2013.01); *H04N 1/00474* (2013.01); *G06F 3/1225* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0195552 A1* | 8/2006 | Nampei | 709/218 |
| 2007/0067413 A1 | 3/2007 | Nishio | |
| 2008/0215666 A1* | 9/2008 | Kadota | 709/202 |
| 2009/0046686 A1* | 2/2009 | Izaki | 370/338 |
| 2012/0099025 A1* | 4/2012 | Kanda | 348/734 |
| 2012/0300242 A1* | 11/2012 | Meike et al. | 358/1.13 |

FOREIGN PATENT DOCUMENTS

| | | |
|---|---|---|
| JP | 2004-280644 | 10/2004 |
| JP | 2006-289690 | 10/2006 |
| JP | 2007-062220 | 3/2007 |
| JP | 2007-0066092 | 3/2007 |
| JP | 2007-069358 | 3/2007 |

* cited by examiner

*Primary Examiner* — Benny Q Tieu
*Assistant Examiner* — Haris Sabah (57) ABSTRACT

An image forming apparatus and a user terminal apparatus are connected to a network. In the image forming apparatus, an input device receives an input of an identification code unique to the user terminal apparatus on the basis of a user operation, and an apparatus information transmitting unit searches for a user terminal apparatus on the network using the identification code and transmit apparatus information on this image forming apparatus to the found user terminal apparatus. In the user terminal apparatus, an identification code managing unit displays an identification code unique to this user terminal apparatus on the display device, an apparatus information acquiring unit receives the apparatus information transmitted from the image forming apparatus to which the identification code was inputted, a driver setup unit sets up the driver program on the basis of the received apparatus information.

3 Claims, 6 Drawing Sheets

IMAGE FORMING SYSTEM, IMAGE FORMING APPARATUS, AND NON-TRANSITORY COMPUTER READABLE RECORDING MEDIUM STORING A SETUP PROGRAM

CROSS-REFERENCE TO RELATED APPLICATIONS

This application relates to and claims priority rights from Japanese Patent Application No. 2013-178663, filed on Aug. 29, 2013, the entire disclosures of which are hereby incorporated by reference herein.

BACKGROUND

1. Field of the Present Disclosure

The present disclosure relates to an image forming system, an image forming apparatus, and a non-transitory computer readable recording medium storing a setup program.

2. Description of the Related Art

In a system (referred as the first system), network setting information is stored in a USB (Universal Serial Bus) flash drive, the USB flash drive is connected to a device, and the device reads the network setting information and sets up network setting on the basis of the network setting information.

In another system (referred as the second system), a user terminal device acquires a device information through a network from a device, and sets up a driver of the device on the basis of the device information.

However, in case of the first system, it is required to store the network setting information in the USB flash drive, and therefore, a user is required knowledge on network technology. In case of the second system, it is required that the user terminal device has been set up so as to enable to perform network communication with the device, and therefore, a user is required knowledge on network technology.

Further, it is possible that the user terminal device searches for devices on the network, selects a target device among the found devices on the search, and installs a driver for the selected device. However, since in general the selected device is identified using its MAC (Media Access Control) address or IP (Internet Protocol) address, it is difficult for a user without knowledge on network technology to select a target device on the basis of its MAC address or IP address.

SUMMARY

An image forming system according to an aspect of the present disclosure includes an image forming apparatus connected to a network; and a user terminal apparatus connected to the network and in which a driver program of the image forming apparatus is installed. The image forming apparatus includes an input device and an apparatus information transmitting unit. The input device is configured to receive an input of an identification code unique to the user terminal apparatus on the basis of a user operation. The apparatus information transmitting unit is configured to search for a user terminal apparatus on the network using the identification code unique to the user terminal apparatus inputted to the input device and transmit apparatus information on this image forming apparatus to the user terminal apparatus found by the search. The user terminal apparatus includes a display device, an identification code managing unit, an apparatus information acquiring unit, and a driver setup unit. The identification code managing unit is configured to display an identification code unique to this user terminal apparatus on the display device. The apparatus information acquiring unit is configured to receive the apparatus information transmitted from the image forming apparatus to which the identification code was inputted. The driver setup unit is configured to set up the driver program on the basis of the received apparatus information.

An image forming apparatus according to an aspect of the present disclosure includes an input device and an apparatus information transmitting unit. The input device is configured to receive an input of an identification code unique to a user terminal apparatus on the basis of a user operation. The apparatus information transmitting unit is configured to search for a user terminal apparatus on the network using the identification code inputted to the input device and transmit apparatus information on this image forming apparatus to the user terminal apparatus found by the search. The identification code is unique to the user terminal apparatus in which a driver program of this image forming apparatus has been installed.

A non-transitory computer readable recording medium according to an aspect of the present disclosure stores a setup program. The setup program causes a computer in a user terminal apparatus in which a driver program is installed for an image forming apparatus connected to a network to act as an identification code managing unit, an apparatus information acquiring unit, and a driver setup unit. The identification code managing unit is configured to display an identification code unique to this user terminal apparatus on a display device. The apparatus information acquiring unit is configured to receive the apparatus information transmitted from the image forming apparatus to which the identification code was inputted. The driver setup unit is configured to set up the driver program on the basis of the received apparatus information.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
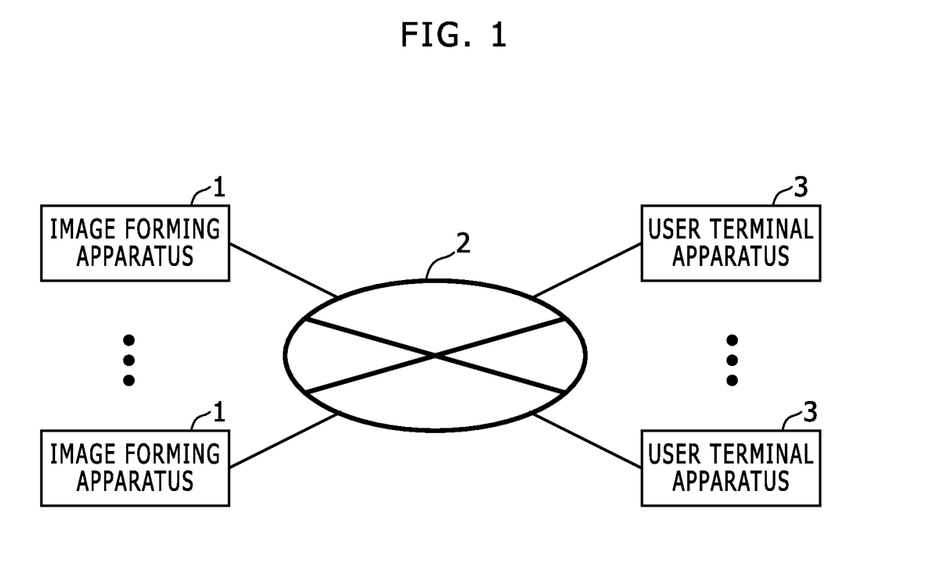
FIG. 1 shows a block diagram that indicates a configuration of an image forming system in an embodiment of the present disclosure.

FIG. 1 shows a block diagram that indicates a configuration of an image forming system in an embodiment of the present disclosure. In the system shown in FIG. 1, an image forming apparatus 1 is connected to a network 2, and plural user terminal apparatuses 3 are also connected to the network 2.

The image forming apparatus 1 is a multi function peripheral, but may be another apparatus having a printing function such as a printer. The network 2 is a local area network such as an office LAN (Local Area Network). The user terminal apparatuses 3 are personal computers or the like in which a driver of the image forming apparatus 1 has been installed.

Here, configurations of the image forming apparatus 1 and the user terminal apparatus 3 are explained.

Figure 2:
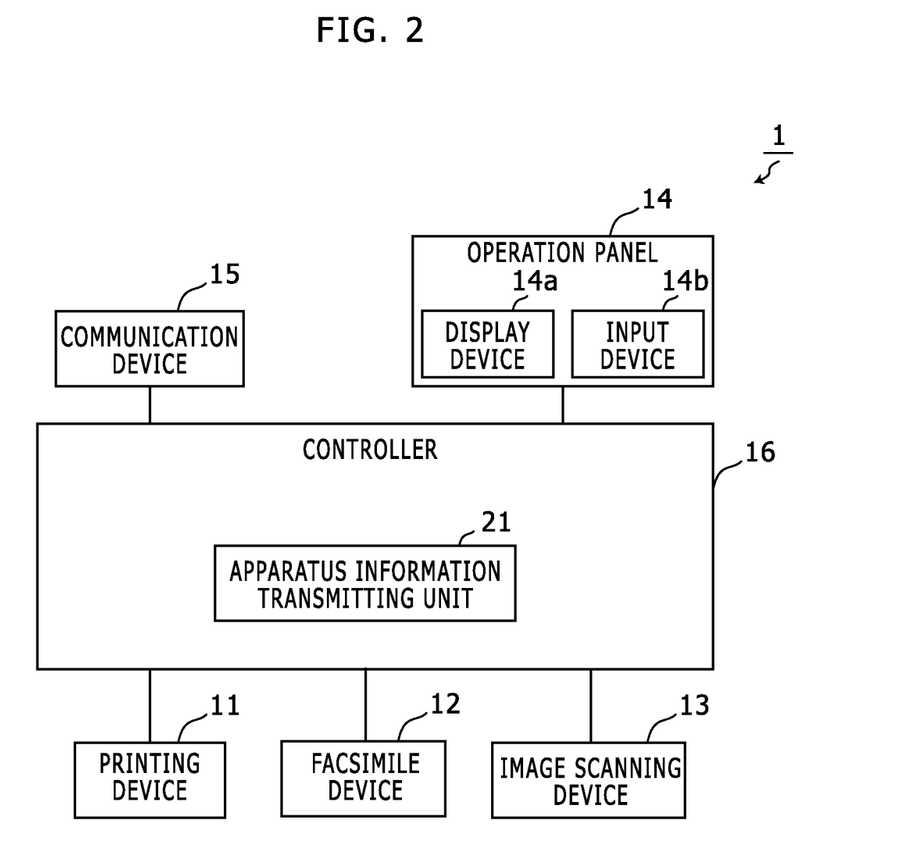
FIG. 2 shows a block diagram that indicates a configuration of an image forming apparatus 1 in FIG. 1.

FIG. 2 shows a block diagram that indicates a configuration of the image forming apparatus 1 in FIG. 1. As shown in FIG. 2, each one of the image forming apparatuses 1 includes a printing device 11, a facsimile device 12, an image scanning device 13, an operation panel 14, a communication device 15, and a controller 16.

The printing device 11 is an internal device that prints each image based on print image data on a paper sheet using electrophotography.

The facsimile device 12 is an internal device that transmits and receives an image as a facsimile signal through a public telephone line using a modem.

The image scanning device 13 is an internal device that scans a document image of a document and generates image data of the document image.

The operation panel 14 is disposed on the case surface of the image forming apparatus 1, and includes a display device 14a that displays information to a user and an input device 14b that receives a user operation. For example, a liquid crystal display is used as the display device 14a. A key switch, a touch panel or the like is used as the input device 14b.

The communication device 15 is a circuit that is connected to the network and performs data communication with another apparatus (e.g. the user terminal apparatus 3) connected to the network 2. For example, a network interface is used as the communication device 15.

The controller 16 includes a CPU (Central Processing Unit), a ROM (Read Only Memory), and a RAM (Random Access Memory), loads a program from the ROM or the like to the RAM, and executes the program with the CPU to embody various processing units. In this embodiment, an apparatus information transmitting unit 21 is embodied in the controller 16.

The apparatus information transmitting unit 21 searches for a user terminal apparatus on the network 2 using the communication device 15 with an identification code unique to the user terminal apparatus 3 inputted to the input device 14b and transmits apparatus information on this image forming apparatus 1 to the user terminal apparatus 3 found by the search.

Figure 3:
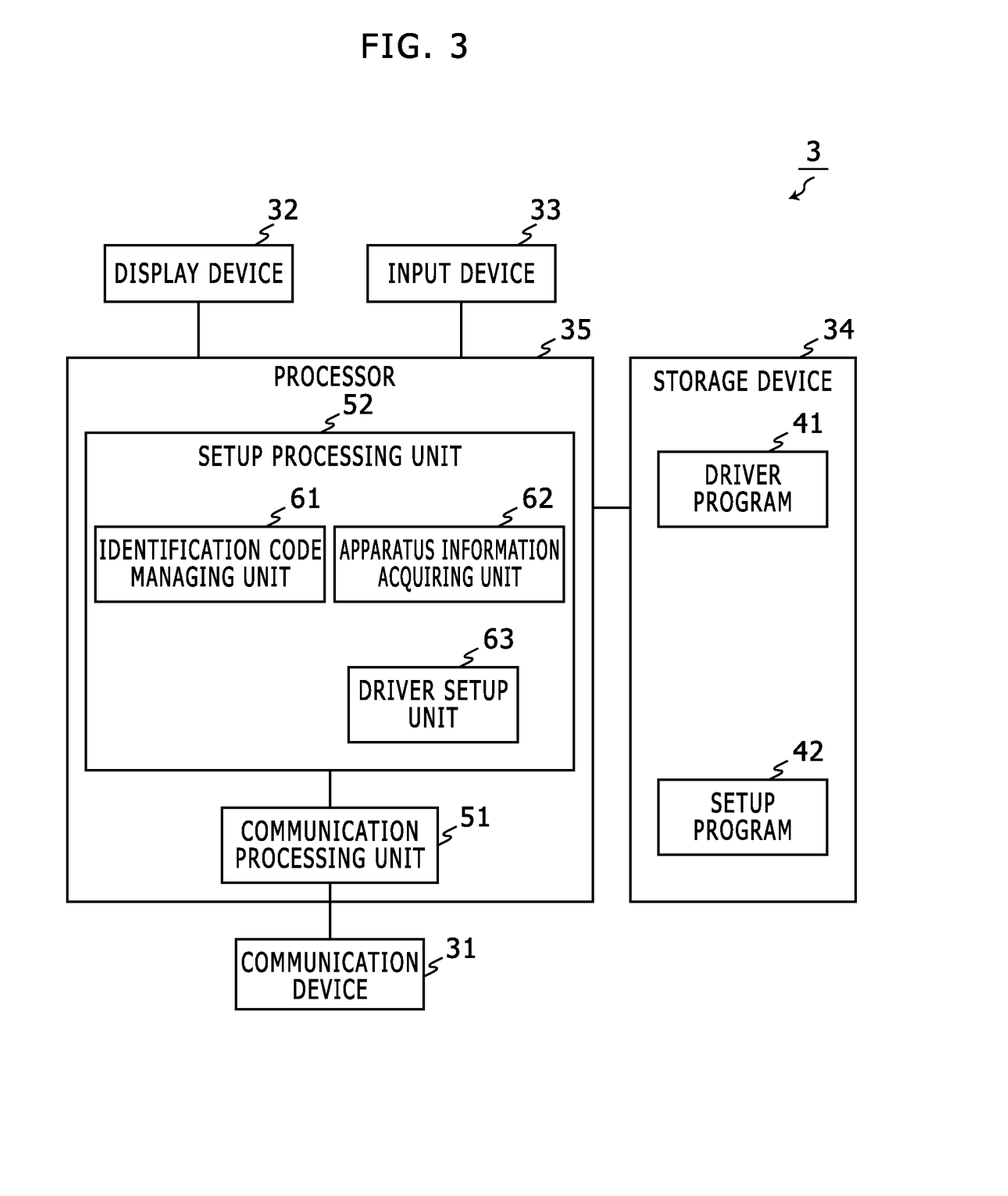
FIG. 3 shows a block diagram that indicates a configuration of a user terminal apparatus 3 in FIG. 1.

FIG. 3 shows a block diagram that indicates a configuration of the user terminal apparatus 3 in FIG. 1. The user terminal apparatus 3 is, for instance, a personal computer having network function in which programs such as an operating system and an application program have been installed. Each one of the user terminal apparatuses 3 includes a communication device 31, a display device 32, an input device 33, a storage device 34, and a processor 35.

The communication device 31 is a device that is connected to the network 2 and performs data communication with other devices (e.g. the image forming apparatus 1) through the network 2 in accordance with a predetermined communication protocol. For example, a network interface, a modem or the like is used as the communication device 31. The display device 32 is a device such as liquid crystal display that displays sorts of screens to a user of the terminal apparatus 3. The input device 33 is a device such as keyboard or mouse that detects a user operation.

The storage device 34 is a device capable of storing data and programs. A non volatile storage medium with a large capacity is used as the storage device 34, such as non volatile memory or hard disk drive. In the storage device 34, an installed driver program 41 and a setup program 42 are stored. Thus, the setup program 42 is stored in a non-transitory computer readable recording medium.

The processor 35 is a computer that includes a CPU, a ROM, and a RAM, and loads programs into the RAM from the storage device 34, the ROM or the like and executes the program with the CPU to embody some processing units.

After the user terminal apparatus 3 starts, sorts of programs are appropriately executed by the processor 35. In this embodiment, processing units such as an unshown operating system and a communication processing unit 51 are embodied by the processor 35, and a setup processing unit 52 is embodied by executing the setup program 42.

The driver program 41 is executed for generating print data such as PDL data from a document data generated by an application and transmitting the print data to a predetermined image forming apparatus 1.

The setup processing unit 52 includes an identification code managing unit 61, an apparatus information acquiring unit 62, and a driver setup unit 63.

The identification code managing unit 61 generates an identification code unique to this user terminal apparatus 3 and displays the identification code on the display device 32. When a broadcast search is performed with this identification code as a search key, the identification code managing unit 61 transmits a response that indicates this identification code was issued by this user terminal apparatus 3.

Using the communication device 31, the apparatus information acquiring unit 62 receives apparatus information transmitted from the image forming apparatus 1 to which the identification code was inputted.

The driver setup unit 63 sets up the driver program 41 on the basis of the apparatus information received by the apparatus information acquiring unit 62. Specifically, the driver setup unit 63 changes values of setting data of the driver program 41 (e.g. a network identifier, a machine type and the like of the image forming apparatus to be controlled by the driver program 41) on the basis of the apparatus information received by the apparatus information acquiring unit 62.

Figure 4:
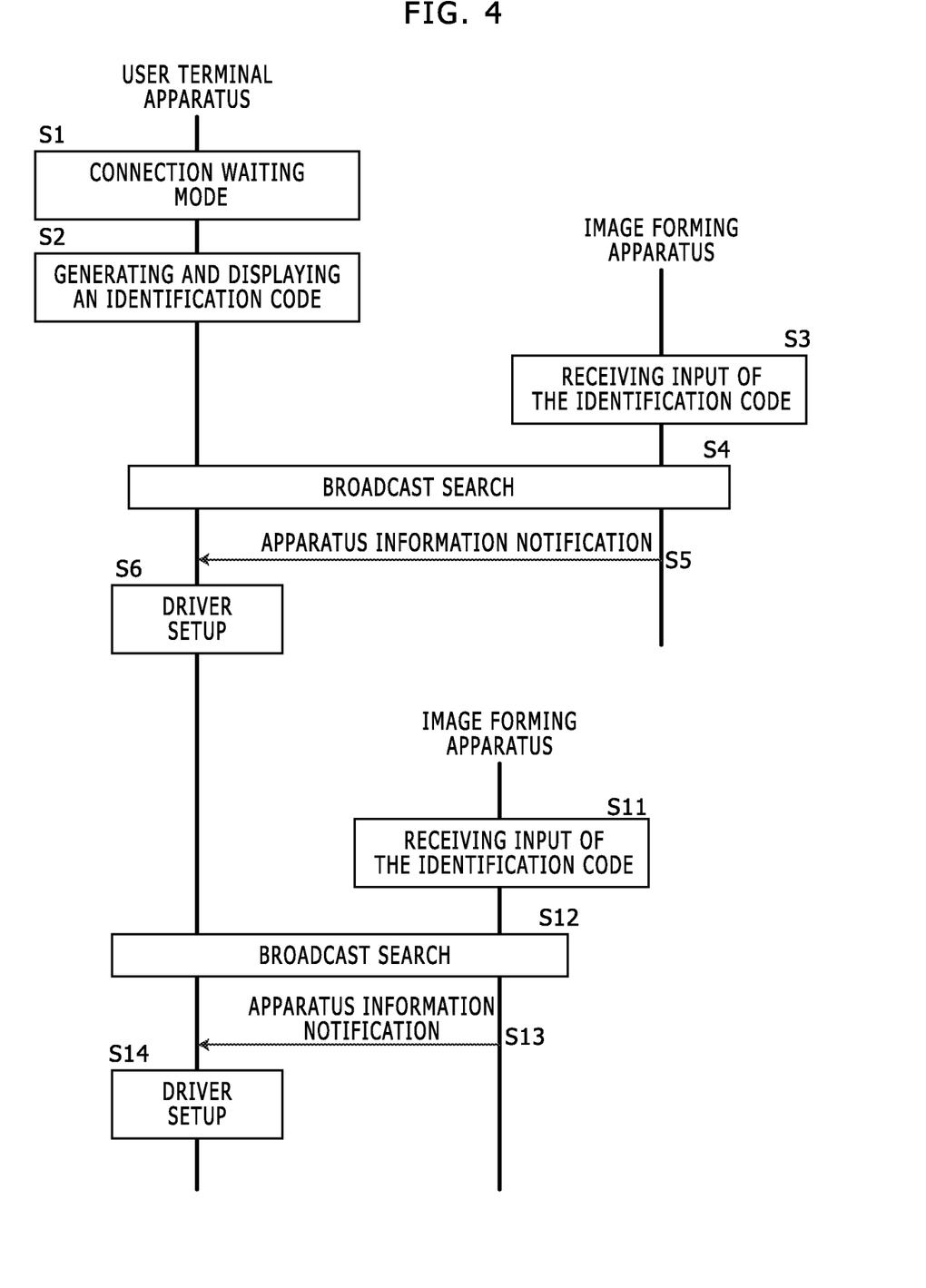
FIG. 4 shows a sequence diagram that explains a setup process for a driver program 41 in the user terminal apparatus 3 in the system shown in FIG. 1.

The following part explains a setup process for the driver program 41 in the user terminal apparatus 3 in the aforementioned system. FIG. 4 shows a sequence diagram that explains a setup process for a driver program 41 in the user terminal apparatus 3 in the system shown in FIG. 1.

Firstly, on the basis of a user operation to the input device 33, the processor 35 executes the setup program 42 and changes an operation mode of the setup processing unit 52 to a connection waiting mode (in Step S1).

Upon changing to the connection waiting mode, the identification code managing unit 61 generates an identification code unique to this user terminal apparatus 3 and displays the identification code on the display device (in Step S2). Afterward, the apparatus information acquiring unit 62 waits until apparatus information is incoming. It should be noted that this identification code may be a serial number of the user terminal apparatus 3, a MAC address of the communication device 31 or a code uniquely derived from such unique information.

Figure 5:
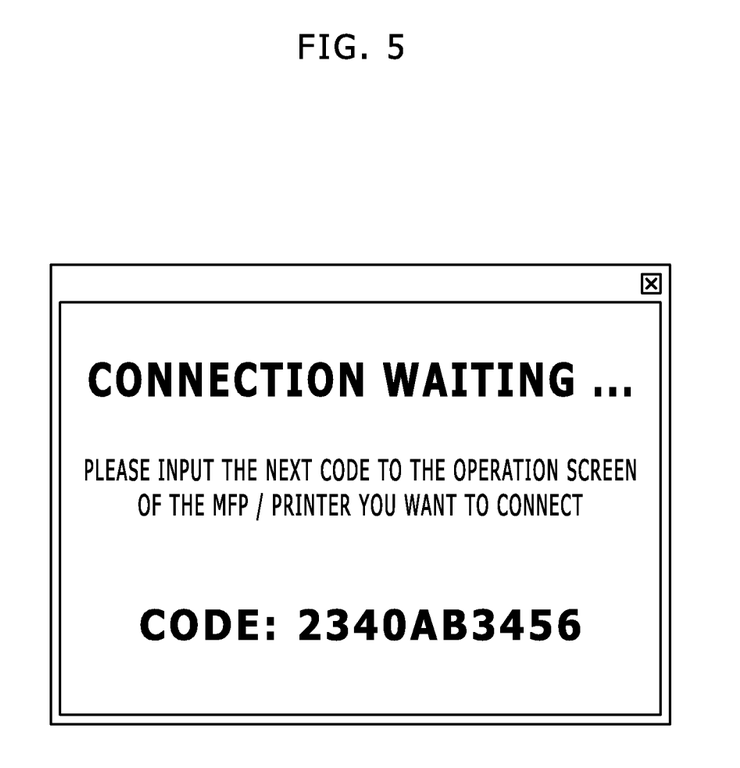
FIG. 5 shows a diagram that indicates an example of an identification code displayed on the user terminal apparatus 3 in FIG. 1.

FIG. 5 shows a diagram that indicates an example of an identification code displayed on the user terminal apparatus in FIG. 1. As shown in FIG. 5, in a window, the identification code is displayed as a text together with a message that indicates the apparatus is in a connection waiting status.

A user who operates the user terminal apparatus 3 memorizes or writes down the identification code displayed on the display device 32 and goes to a place where a desired image forming apparatus 1 is located. Subsequently, the user operates the image forming apparatus 1 to cause the image forming apparatus 1 to display an input screen of the identification code on the display device 14a.

On the basis of this user operation, the apparatus information transmitting unit 21 displays an input screen of an identification code on the display device 14a.

Figure 6:
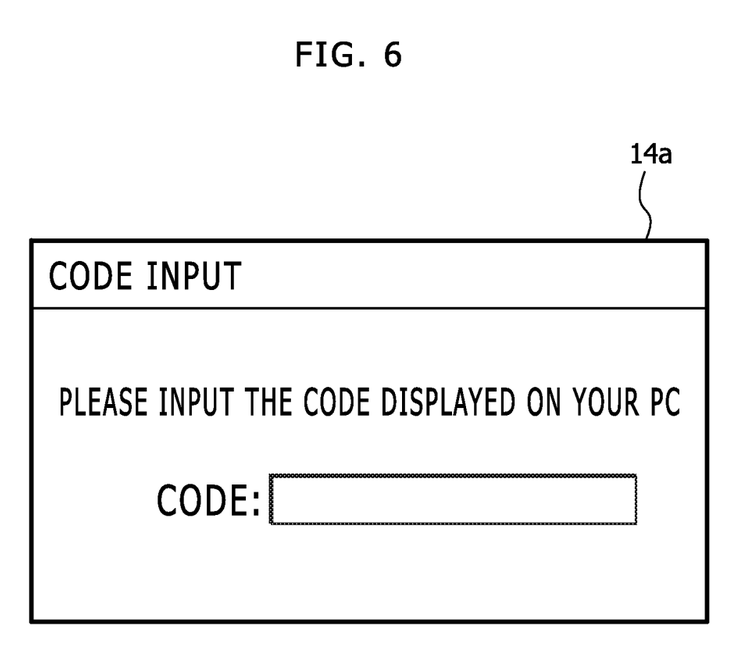
FIG. 6 shows a diagram that indicates an example of an input screen of an identification code, displayed on the image forming apparatus 1 in FIG. 1.

FIG. 6 shows a diagram that indicates an example of an input screen of an identification code, displayed on the image forming apparatus 1 in FIG. 1.

The user inputs the memorized or written down identification code into an input field in the input screen using the input device 14b. The apparatus information transmitting unit 21 received the inputted identification code (in Step S3).

The apparatus information transmitting unit 21 performs broadcast search on the network 2 using the communication device 15 with the inputted identification code as a search key (in Step S4). The broadcast search is performed in accordance with a predetermined known communication protocol.

Upon receiving a message of the broadcast search, the identification managing unit 61 of the user terminal apparatus 3 in the connection waiting mode determines whether the identification code as the search key is equal to the identification code of this user terminal apparatus 3 or not. If the identification code as the search key is equal to the identification code of this user terminal apparatus 3, the identification managing unit 61 transmits a response.

Upon receiving the response, the apparatus information transmitting unit 21 of the image forming apparatus 1 identifies a network identifier (e.g. IP address) of the user terminal apparatus 3 that is the sender of the response, and transmits apparatus information (machine type, available communication protocol, and the like) of this image forming apparatus 1 to a destination specified by the network identifier (in Step S5).

The apparatus information acquiring unit 62 of this user terminal apparatus 3 receives the apparatus information in the connection waiting mode, and the driver setup unit 63 sets up the driver program 41 on the basis of the apparatus information (in Step S6).

Therefore, this user terminal apparatus 3 is enabled to use the image forming apparatus 1 in which the user inputted the identification code. Specifically, an application or the like in this user terminal apparatus 3 is enabled to causes this image forming apparatus 1 to perform printing or the like using the driver program 41.

After the user inputs the identification code to the image forming apparatus 1, the aforementioned setup of the driver program 41 is automatically performed in the user terminal apparatus 3, and therefore, it is possible that the user goes to a place where another image forming apparatus 1 is located without returning to a place where the user terminal apparatus 3 is located and also inputs the identification code to this other image forming apparatus 1 as well, and causes the aforementioned setup of the driver program 41 to be automatically performed in the user terminal apparatus 3 (in Steps S11 to S14). Thus, using one identification code, it is possible to automatically set up the driver programs 41 for the plural image forming apparatus.

In the aforementioned embodiment, the image forming apparatus 1 searches for a user terminal apparatus 3 on the network 2 with the identification code unique to the user terminal apparatus 3 inputted to the input device 14b, and transmits apparatus information on this image forming apparatus 1 to the user terminal apparatus 3 found by the search. Meanwhile, the user terminal apparatus 3 displays the identification code unique to this user terminal apparatus 3 on the display device 32, receives apparatus information transmitted from the image forming apparatus 1 to which this identification code was inputted, and sets up the driver program 41 on the basis of the received apparatus information.

Consequently, a user is required only to input an identification code displayed on the user terminal apparatus 3 to a user-desired image forming apparatus 1, and therefore, even if the user does not have knowledge on network technology, the user can set up a driver of the user-desired image forming apparatus 1.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system, comprising:
an image forming apparatus connected to a network; and
a user terminal apparatus connected to the network and in which a driver program of the image forming apparatus is installed;
wherein the image forming apparatus comprises:
a central processing unit;
an input device configured to receive an input of an identification code unique to the user terminal apparatus on the basis of a user operation;
an apparatus information transmitting unit configured to search for the user terminal apparatus on the network using the identification code unique to the user terminal apparatus inputted to the input device and transmit apparatus information on this image forming apparatus to the user terminal apparatus found by search;
wherein function of the apparatus information transmitting unit is implemented by the central processing unit; and
the user terminal apparatus comprises:
a processor;
a display device;
an identification code managing unit configured to display the identification code unique to this user terminal apparatus on the display device;
an apparatus information acquiring unit configured to receive the apparatus information transmitted from the image forming apparatus to which the identification code was inputted;
a driver setup unit configured to set up the driver program on the basis of the received apparatus information; wherein
the identification code managing unit is further configured to automatically display the identification code on the display device upon changing to a connection waiting mode and to display a message indicating that the user terminal apparatus is in a connection waiting status and the message indicating that the identification code displayed should be manually entered in the image forming apparatus order to connect to the image forming apparatus;

the apparatus information acquiring unit is further configured to wait in the connection waiting mode until the transmitted apparatus information is incoming;

the driver setup unit is further configured to set up the driver program on the basis of the apparatus information received in the connection waiting mode;

the identification code is a serial number of the user terminal apparatus; and the apparatus information includes a machine type and an available communication protocol; wherein functions of the identification code managing unit, the apparatus information acquiring unit and the driver setup unit configured are implemented by the processor.

2. The image forming system according to claim 1, further comprising plural image forming apparatuses including the image forming apparatus; wherein each one of the image forming apparatuses comprises:

said central processing unit;

said input device, and said apparatus information transmitting unit; and the apparatus information acquiring unit is further configured to receive plural pieces of the apparatus information transmitted from the plural image forming apparatuses to which the identification code was inputted, and the driver setup unit is further configured to set up respective driver programs of the plural image forming apparatuses on the basis of the received plural pieces of the apparatus information.

3. An image forming system, comprising:

a plurality of image forming apparatuses connected to a network; and a user terminal apparatus connected to the network;

wherein each one of said plurality of image forming apparatuses comprises:

a central processing unit;

an input device configured to receive an input of an identification code unique to the user terminal apparatus on the basis of a user operation;

an apparatus information transmitting unit configured to search for the user terminal apparatus on the network using the identification code unique to the user terminal apparatus inputted to the input device and transmit apparatus information on this image forming apparatus to the user terminal apparatus found by the search; wherein function of the apparatus information transmitting unit is implemented by the central processing unit; and the user terminal apparatus comprises:

a processor;

a display device;

an identification code managing unit configured to display the identification code unique to this user terminal apparatus on the display device;

an apparatus information acquiring unit configured to receive plural pieces of the apparatus information transmitted from the plural image forming apparatuses to which the identification code was inputted;

a driver setup unit configured to set up respective driver programs of the plural image forming apparatuses on the basis of the received plural pieces of the apparatus information; wherein the identification code managing unit is further configured to automatically display the identification code on the display device upon changing to a connection waiting mode and to display a message indicating that the user terminal apparatus is in a connection waiting status and the message indicating that the identification code displayed should be manually entered into the image forming apparatus that is to be connected to the user terminal apparatus;

the driver setup unit is further configured to set up the driver program on the basis of the apparatus information received in the connection waiting mode;

the identification code is a serial number of the user terminal apparatus;

the apparatus information includes a machine type and an available communication protocol; and the apparatus information acquiring unit is further configured to remain in the connection waiting mode after apparatus information is received from one of said plurality of image forming apparatuses;

wherein functions of the identification code managing unit, the apparatus information acquiring unit and the driver setup unit configured are implemented by the processor.

\* \* \* \* \*